United States Patent
Xu et al.

(10) Patent No.: US 8,122,437 B2
(45) Date of Patent: Feb. 21, 2012

(54) METHOD AND APPARATUS TO TRACE AND CORRELATE DATA TRACE AND INSTRUCTION TRACE FOR OUT-OF-ORDER PROCESSORS

(75) Inventors: Zheng Xu, Austin, TX (US); Suraj Bhaskaran, Austin, TX (US); Klas M. Bruce, Leander, TX (US); Jason T. Nearing, Austin, TX (US); Paul B. Rawlins, Austin, TX (US); Matt B. Smittle, Allen, TX (US); Michael D. Snyder, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 993 days.

(21) Appl. No.: 12/058,874

(22) Filed: Mar. 31, 2008

(65) Prior Publication Data

US 2009/0249302 A1 Oct. 1, 2009

(51) Int. Cl.
*G06F 9/44* (2006.01)
*G06F 11/00* (2006.01)
(52) U.S. Cl. .......................................... 717/128; 714/35
(58) Field of Classification Search .................. 717/128; 714/35
See application file for complete search history.

(56) References Cited

U.S. PATENT DOCUMENTS

| | | | | |
|---|---|---|---|---|
| 5,751,942 A | * | 5/1998 | Christensen et al. | ...... 714/38.13 |
| 6,681,321 B1 | * | 1/2004 | Dale et al. | ...................... 712/227 |
| 7,043,668 B1 | * | 5/2006 | Treue et al. | ...................... 714/45 |
| 7,093,236 B2 | * | 8/2006 | Swaine et al. | ................. 717/128 |
| 2004/0250164 A1 | * | 12/2004 | Ahmad et al. | .................. 714/30 |
| 2006/0271919 A1 | * | 11/2006 | Moyer | ........................... 717/136 |

OTHER PUBLICATIONS

Dean et al., "ProfileMe: Hardware Support for Instruction-Level Profiling on Out-of-Order Processors," IEEE, 1997, 10pg.*
Pan et al., "Improving the Accuracy of Dynamic Branch Prediction Using Branch Correlation," ACM, 1992, 18pg.*
IEEE-ISTO, The Nexus 5001 Forum Standard for a Global Embedded Processor Debug Interface, v. 2.0, Dec. 23, 2003.
Zheng Xu et al., Techniques for Tracing Processes in a Multi-Threaded Processor, U.S. Appl. No. 11/733,978, filed Apr. 11, 2007.
Zheng Xu et al., Data Acquisition Messaging Using Special Purpose Registers, U.S. Appl. No. 11/848,826, filed Aug. 31, 2007.

* cited by examiner

*Primary Examiner* — Li Zhen
*Assistant Examiner* — Ryan Coyer
(74) *Attorney, Agent, or Firm* — Hamilton & Terrile, LLP; Michael Rocco Cannatti

(57) ABSTRACT

In a data processing system, a marked bit is used to identify a data access instruction throughout the pipeline to indicate that the instruction meets user-specified criteria (e.g., a meets a data address range of interest). Based on the marked bit, an in-order program correlation message is generated which indicates when the data access instruction occurs relative to the instruction stream. The marked bit is also used to generate an in-order data trace message. As a result, the trace streams including only data access instructions meeting user-specified criteria may be post-processed and correlated precisely.

19 Claims, 3 Drawing Sheets

METHOD AND APPARATUS TO TRACE AND CORRELATE DATA TRACE AND INSTRUCTION TRACE FOR OUT-OF-ORDER PROCESSORS

BACKGROUND OF THE INVENTION

1. Field of the Invention

The present invention is directed in general to data processing systems. In one aspect, the present invention relates to a tracing mechanism and methodology for debugging data processing systems.

2. Description of the Related Art

Debugging processes often use tracing techniques to capture and analyze data and/or program information (referred to as "trace" information) for purposes of understanding the memory operation of the program flow. The trace information is typically obtained from a data processing system with an external test (debug or "emulator") system which uses a debug communication protocol to communicate trace information from the data processing system through selected pins of the data processing system to the external test system using a special interface (e.g., a special printed circuit board (PCB) having a socket). Providing debug information in real-time, without intrusion on the normal operation of the data processing system, is highly desirable in order for the actual debug operations to remain transparent to operation of the system. One example of a debug communications protocol is the IEEE ISTO-5001 NEXUS debug standard which is used by a debugger operably coupled to the data processor undergoing debug. The NEXUS debug standard defines a number of debug capabilities to monitor program execution by providing visibility into program flow and data flow. This visibility consists of a sequence of information messages provided over a dedicated multi-bit or multi-terminal serial interface or auxiliary port to an external development system. Program flow messages are then combined with a static image of the program to reconstruct the actual instruction execution sequence of the data processor under test. Data flow messages track processor reads and writes to pre-defined address ranges. In a conventionally designed processor, data trace information is obtained by snooping the system bus for qualified memory transactions. For processors with a cache memory hierarchy, data trace with visibility beyond the cache is required to provide correct representation of the memory operations in the instruction flow. Typically, the transactions between the processor and cache memory management unit are observed, and qualified data accessed are traced. In both scenarios, the data trace can be correlated with the instruction trace by providing program correlation information at the event of the data trace. To this end, the NEXUS debug standard provides a Program Correlation Message (PCM) which identifies a qualified data trace access by inserting into the instruction trace the corresponding instruction count between the last branch instruction and the qualified data trace access, thereby enabling the instruction trace and data trace to be correlated.

For high performance data processing systems, there are practical limitations exist that constrain the use of real-time tracing. One such limitation occurs with superscalar out-of-order embedded processor designs where data traces and instruction traces are not properly associated. For example, if a storage buffer or a load store unit (LSU) reservation station for outstanding cache accesses is used to handle the speculative data access due to out of order execution, the observed data accesses at the cache memory management unit may not correlate with the precise boundary of the instruction flow at completion, particularly when instruction trace information is compressed to reflect only branch instructions. Uncorrelated instruction trace and data trace information can cripple the effectiveness of the real-time trace data to the external debugger. Furthermore, the cache design may be non-blocking so that the subsequent cache access could bypass the earlier cache access if there is no data dependency and the earlier cache access is halted due to the long latency access event such as cache miss. This will seriously impact the usefulness of the data trace for high performance out of order processor.

Another limitation with real-time tracing is a possible mismatch between the rate at which trace information is generated by the data processor, and the rate at which the trace information is transmitted from the data processor to an external debug system. For example, current embedded processors have internal clocking speeds of 400 MHz or more that are many times faster than the transmission/processing speed of an external debug system. When a burst of trace information is too large and generated faster than it can be off-loaded to the external debug system, a buffer "over-run" error occurs in which subsequently generated trace information is unusable. Accordingly, there is a need for an improved system and methodology for efficiently tracing and correlating data trace and instruction trace information which overcomes the problems in the art, such as outlined above. Further limitations and disadvantages of conventional processes and technologies will become apparent to one of skill in the art after reviewing the remainder of the present application with reference to the drawings and detailed description which follow.

BRIEF DESCRIPTION OF THE DRAWINGS

The present invention may be understood, and its numerous objects, features and advantages obtained, when the following detailed description of a preferred embodiment is considered in conjunction with the following drawings, in which.

DETAILED DESCRIPTION

A debug system and methodology are described for selectively generating correlated data and instruction trace information from a data processing system by using a marked bit (DMRK) throughout the pipeline to identify an instruction marked with the data address range of interest. Based on the DMRK bit, an in-order Program Correlation Message (PCM) can be generated by a completion unit (COMP) to indicate when the data access instruction occurs relative to the instruction stream. The DMRK bit is also used by a load store unit (LSU) to generate an in-order data trace message based on the initial request of load/store operation from the load/store queue. When both trace streams are post-processed after the run, they can be correlated precisely.

Various illustrative embodiments of the present invention will now be described in detail with reference to the accompanying figures. While various details are set forth in the following description, it will be appreciated that the present invention may be practiced without these specific details, that logical, architectural, programmatic, mechanical, electrical and other changes may be made, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present invention will now be described in detail below with reference to the figures.

Figure 1:
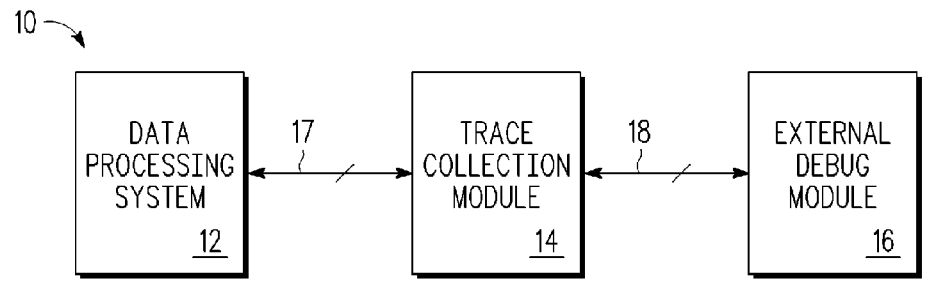
FIG. 1 depicts an exemplary block diagram of a debugging system environment.

Turning now to FIG. 1, there is depicted an exemplary block diagram of a debugging system environment 10. Debugging system environment 10 may include a data processing system 12, a trace collection module 14, and an external debug module 16. Data processing system 12 may be a single core processor, a multiple core processor, a system on chip, a chip multiprocessor, a multi-threaded processor, a high performance superscalar out-of-order embedded processor, or any device that can be debugged. Although not shown, data processing system 12 may include other components, such as memory, as well. Trace collection module 14 may be a trace collection device which may be used to collect debugging related data, including trace data, on-chip or off-chip. External debug module 16 may be a debugging system, such as a hardware probe module. External debug module 16 may be used by a user to debug data processing system 12. Data processing system 12 may communicate with trace collection module 14 via bus 17. External debug module 16 may communicate with trace collection module 14 via bus 18. Although FIG. 1 shows trace collection module 14 and external debug module 16, other embodiments consistent with the invention may not need trace collection module 14 and external debug module 16. Instead, a trace buffer located inside data processing system 12 may be used to accumulate trace message data.

As used herein, the term "bus" is used to refer to one or more signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Figure 2:
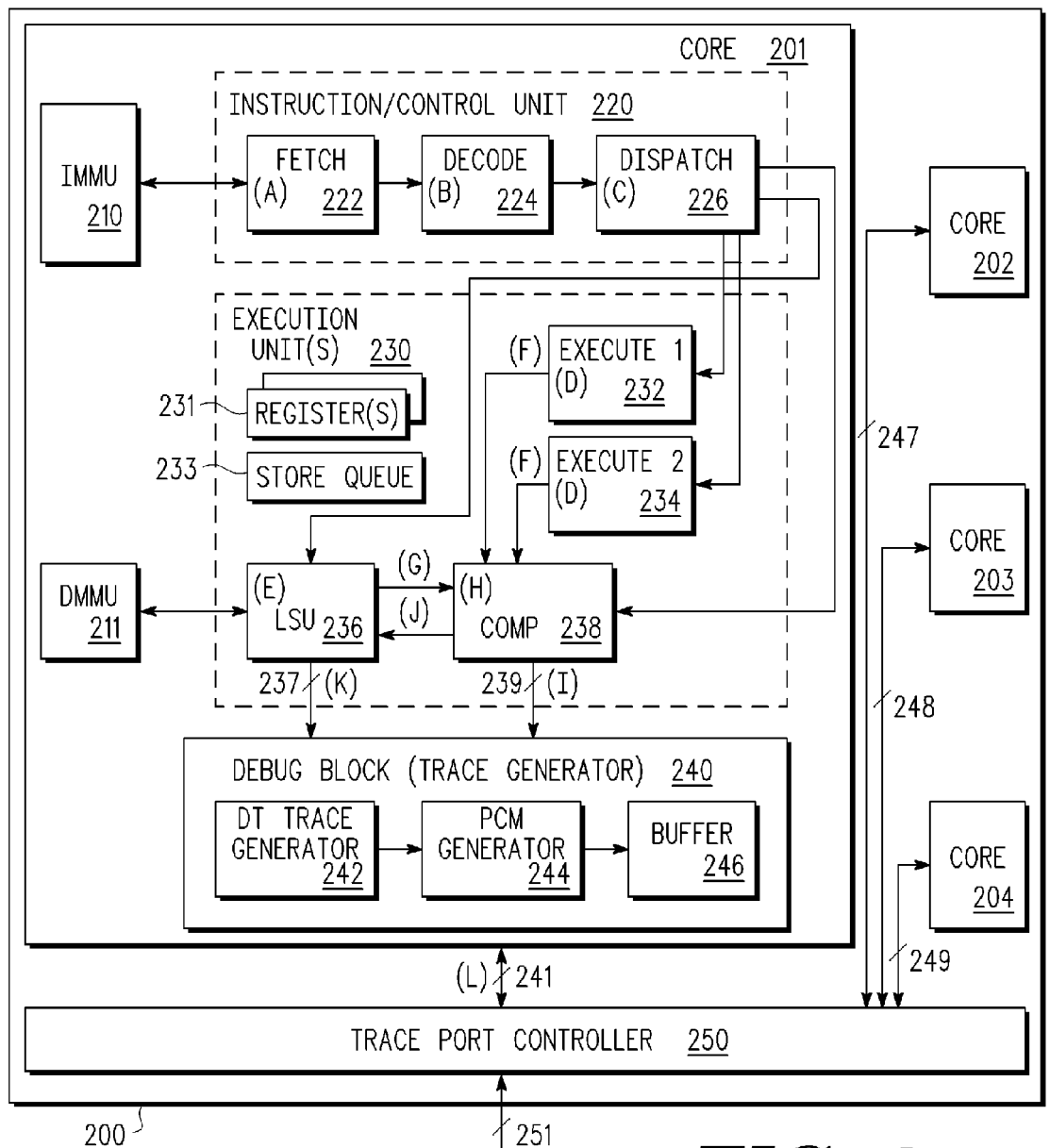
FIG. 2 depicts an exemplary block diagram of a data processing system for debugging in the debugging system environment.

FIG. 2 depicts an exemplary block diagram of a data processing system 200 for debugging in the debugging system environment. Data processing system 200 may include one or more processing cores 201, 202, 203, 204 that are electrically coupled to a trace port controller 250 which is used to communicate directly or indirectly with an external test (debug or "emulator") system via bus 251. For the sake of convenience, only relevant details of the processing core 201 are shown, and it will be appreciated that processing cores 202, 203, 204 may include similar components. By way of example, processing core 201 may include a memory interface or management unit (MMU) for instruction (IMMU) 210 and data DMMU 211; an instruction/control unit 220 for fetching, decoding and dispatching instructions; one or more execution units 230 in which instructions are loaded, stored, executed and completed; and a debug block 240 which includes logic and/or circuitry for generating data and trace information. Although FIG. 2 shows one instruction/control unit 220 and one execution unit 230, it will be appreciated that the processing core 201 may include additional execution units and instruction/control units. In addition, processing core 201 may include many additional components other than the exemplary ones shown in FIG. 2.

In operation, the instruction/control unit 220 fetches and decodes instructions from memory (not shown) using the memory interface 210. In an example embodiment, the instruction/control unit 220 includes a fetch unit 222 which fetches or retrieves one or more instructions ahead of actual execution, a decode unit 224 which decodes the fetched instruction(s), and a dispatch unit 226 which dispatches one or more instructions to the execution unit 230. Resources in the execution unit 230, such as integer execution units 232, 234, load store unit (LSU) 236, and write-back/completion (COMP) unit 238, are used to execute and complete the dispatched instructions. Each execution unit 230 may also include general and/or special purpose registers 231 for use in performing arithmetic instructions (such as, for example, add, multiply, subtract, and divide instructions).

Referring still to FIG. 2, debug block 240 may include a data trace (DT) generator 242, a program correlation message (PCM) generator 244, and a trace buffer 246. The DT generator 242 may generate a data trace messages constructed with the trace information from LSU 236. PCM generator 244 may generate a PCM message based on the decoded contents of configuration register 231. Trace buffer 246 may be used to buffer the generated PCM messages. By way of one or more busses 241, 247, 248, 249, trace port controller 250 may receive the PCM messages from the trace buffers (e.g., 246) of the various processing cores 201, 202, 203, 204, and transmit them to trace collection module (e.g., trace collection module 14 shown in FIG. 1) via bus 251. Although a shared trace port controller 250 is shown, the trace port controller may instead be included as part of debug logic in each processor core.

In accordance with selected embodiments, data trace information can be correlated with the instruction trace information in a controlled fashion by using a marked bit (DMRK) in the processor pipeline to selectively generate Program Correlation Messages (PCMs) for predetermined instructions of interest. As shown in the example embodiment of FIG. 2, two trace message streams are collected by the debug block 240 and transferred to the external debug facility through a common message queue 246. One trace message stream consists of Data Trace (DT) messages 237 constructed with the trace information from the load store unit (LSU) 236. The other trace message stream consists of Program Correlation Message (PCM) 239 constructed with the trace information from the completion unit (COMP) 238. Each PCM indicates the precise boundary in the Instruction Trace (IT) stream when the store-related operation happens by specifying an instruction count from the previous branch instruction.

By maintaining the sequential order of both the DT message stream 237 and the PCM stream 239, and ensuring a consistent mapping between the DT stream 237 and the PCM stream 239, the data trace information may be conveyed with the instruction trace information for subsequent correlation and post-processing by the external debug facility, even with aggressive data trace filtering. However, the mapping between the DT message stream 237 and the PCM stream 239 can be difficult to maintain, particularly with a high performance superscalar out-of-order processor design with non-blocking LSU, due to the enormous trace bandwidth required without proper filtering. And even when the mapping can be maintained, the resulting data and instruction trace information generated by the processor core can over-run the debug block 240 if not controlled or limited.

The data trace information can be selectively generated and correlated with instruction trace information by using the debug block 240 to selectively generate in-order DT and PCM trace streams. In selected embodiments, the debug block 240 generates PCM messages in sequential order by generating the PCM stream only in response to receiving store instruction completion information which is marked with DMRK from the completion unit 238. In effect, the logic in the completion unit 238 guarantees the correct, sequential ordering of the PCM stream. To prevent trace information from over-running, the data and instruction trace information may be selectively generated by filtering the trace information generated at the debug block 240 using DMRK bits to mark the occurrence of interesting data trace events within the specified address ranges or with specified instruction attributes. By setting a DMRK bit in the LSU 236 to identify the occurrence of interesting data trace events within the specified address ranges, and then passing the DMRK bit with the instruction to the completion unit 238, the DMRK bit effectively drives and filters the generation of in-order PCM. At the completion unit 238, the DMRK bit identifies which data access instructions are to be used to generate PCM messages, and at the LSU 236, the DMRK bit identifies which data trace messages are generated. Thus, the DMRK bit filters both the in-order PCM message stream generated by the completion unit 238 and the in-order data trace message stream generated by the LSU 236.

The generation of filtered, correlated trace information may be illustrated with reference to any example sequence whereby an instruction is processed by the pipelined processor core 201. After an instruction is fetched by the fetch unit 222 (as indicated at (A)) and then decoded by the decode unit 224 (as indicated at (B)), it is dispatched by the dispatch unit 226 (as indicated at (C)). Depending on the type of instruction, the instruction is dispatched in-order to the one of the execution units 232, 234 (as indicated at (D)) or the LSU 236 (as indicated at (E)). Depending on conditions at the execution unit (e.g., 232), the instruction may be executed out-of-order, and the out-of-order results are sent to the completion unit 238 for finishing (as indicated at (F)). And at the LSU 236, a load or store operation may be performed by calculating an address for the instruction (as indicated at (E)), and then generating or setting a DMRK bit if the calculated address corresponds to a user-selected address range of interest. In an example implementation, DMRK bits are evaluated in LSU 236 after the address comparison in a data memory management unit 210 and prior to allocating entries in the store queue 233. In this way, DMRK bits are used to mark the occurrence of interesting data trace events within the specified address ranges. The LSU 236 then sends the results with the DMRK bit to the completion unit 238 for finishing (as indicated at (G)). At the completion unit 238, the DMRK bits are stored in the Reorder Buffer (ROB) (not shown).

The completion unit 238 completes the instructions in-order and uses the received DMRK bit to generate PCM messages for only those instructions which have the DMRK bit set (as indicated at (H)). The resulting PCM messages are sent by the completion unit 238 as instruction trace information 239 to the debug block 240 (as indicated at (I)). In addition, the completion unit 238 instructs the LSU 236 to commit the store operation (as indicated at (J)). In an example implementation, when the completion unit 238 retires a store instruction, it sends a store_valid signal to store queue in LSU 236 to clear the speculation mark of the store queue entry and post the store operation. In the mean time, the completion unit 238 sends the store_inst_comp bit for qualified store instructions to the debug block 240 along with the DMRK bits (if any) which are set in the ROB to indicate that the store instruction of interest is retired. The debug block 240 uses the precise store_inst_comp signal to trigger the PCM to indicate exactly when the store instruction completes.

In response to the store commit signal (J) from the completion unit 238, the LSU 236 generates and sends the data trace message to the debug block 240 (as indicated at (K)). At the debug block 240, the data trace and instruction trace information is assembled as trace is then sent to the trace port controller over the bus 241 (as indicated at (L)).

Figure 3:
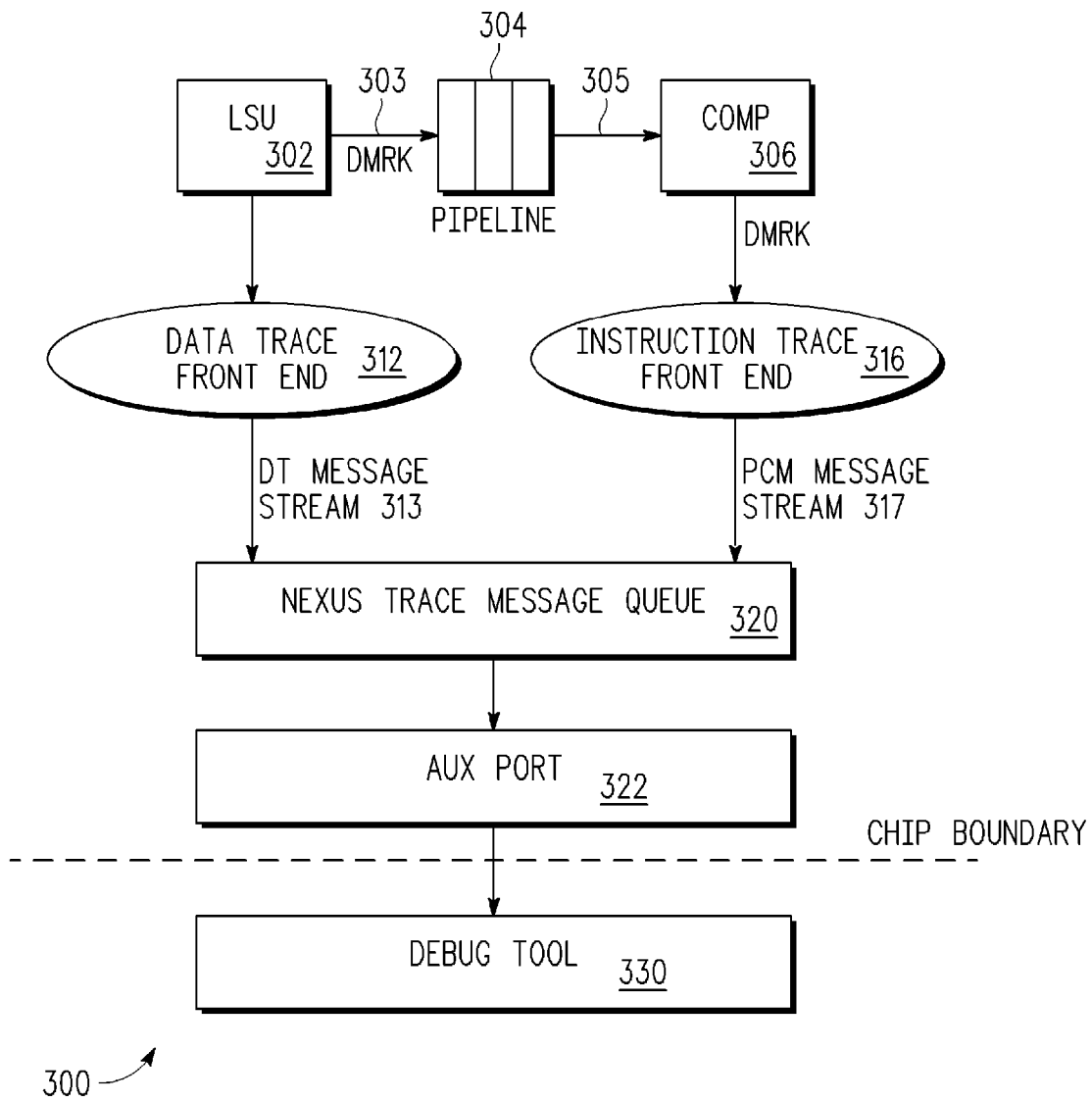
FIG. 3 is a schematic block diagram of a debug interface for tracing processes.

While the description provided herein with reference to FIG. 2 illustrates an example implementation, it will be appreciated that selected embodiments of the present invention may be understood with reference to a more generalized implementation. For example, reference is now made to FIG. 3 which shows a schematic block diagram of a debug interface 300 for tracing processes. As depicted, correlated data trace messages and program correlation messages are generated on-chip by a pipelined processor by using a marked bit (DMRK) to limit and correlate the number of instructions and data accesses that are traced. In particular, the LSU 302 may set the DMRK bit for a particular type of store-related instruction that meets user-selected criteria, and then sends the DMRK bit 303 and associated instruction for execution through the pipeline 304 until it reaches 305 the completion unit 306. By sending the DMRK bit with an instruction through the pipeline 304, the completion unit 306 is able to determine that the instruction is marked with a debug criteria match condition (e.g., an address range of interest). In this way, the data trace front end 312 on the data side of processor core generates the data trace message stream 313 and the instruction trace front end 316 on the completion side of processor core generates the PCM stream 317. The DT message stream 313 and PCM message stream 317 are provided to a trace message queue 320, which determines whether the messages are to be transmitted in real-time or stored for later transmission. Messages that are to be transmitted to the debug tool 330 are transferred through an auxiliary or trace port 322, either directly or through an input/output interface (not shown).

As seen from the foregoing, selected embodiments of the present invention may be used to filter the types of instructions that are traced, thereby selecting a subset from the types of store-related instructions that could be traced. For example, Table 1-1 lists below five different types of store-related instructions. If it is desired to generate DT and corresponding PCM messages for only type 0, 1, and 2 store instructions, then the LSU may be configured to set the DMRK bit for only type 0, 1, and 2 store instructions. Based on the set DMRK bit, the store_inst_comp signal from completion unit will only be asserted for these type of store instructions.

TABLE 1-1

Store-related instruction types

| Type | Description | Instruction |
| --- | --- | --- |
| 0 | Normal store instructions | |
| 1 | Store conditional instructions | stwcx, stdcx |
| 2 | Data cache block zero/allocate | dcbz, dcba |
| 3 | Data cache block flush/touch/invalidate | dcbf, dcbt, dcbtst, dcbi |
| 4 | Memory sync, Tlb sync | msync, tlsync |

Figure 4:
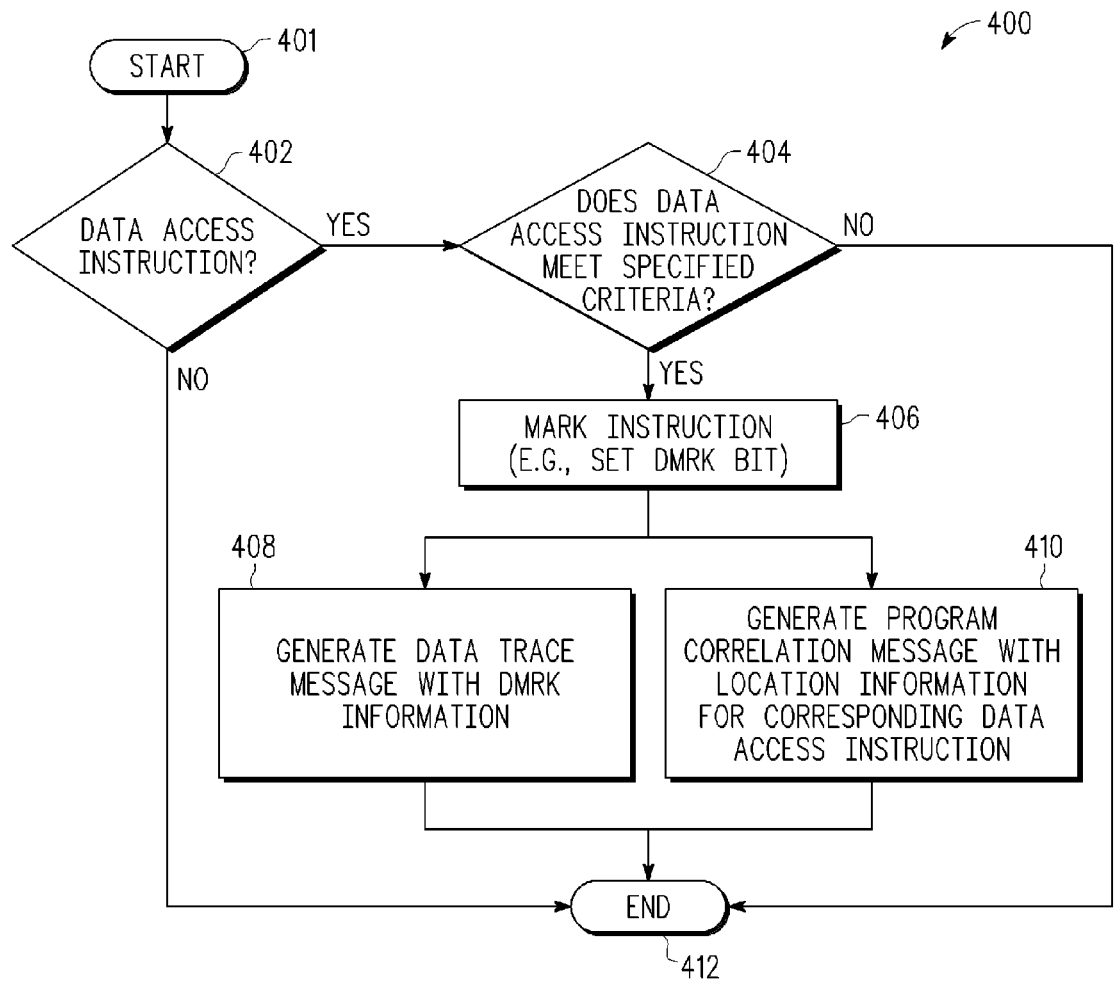
FIG. 4 depicts a flowchart for an exemplary method for generating the correlated and filtered instruction and data trace information.

Selected embodiments of the present invention may also be illustrated with reference to FIG. 4, which depicts a flowchart 400 for an exemplary method for generating the correlated instruction and data trace information in connection with selected embodiments of the present invention. As depicted, the process starts (step 401) when the processor pipeline receives an instruction. As an initial step, the pipeline determines whether the instruction is a data access instruction (decision block 402). If not (negative outcome to decision 402), then there is no additional data trace processing (as indicated by the routing to the "end" step 412. On the other hand, if a data access instruction is received (affirmative outcome to decision 402), then the received data access instruction is compared against user-specified criteria (step 404). For example, the data access address and one or more attributes from the received data access instruction are compared against criteria that may be established by the user to identify predetermined store-related instructions for which PCM messages are desired.

If the received data access instruction do not meet the specified criteria (negative outcome to decision 404), then there is no additional data trace processing (as indicated by the routing to the "end" step 412. But if the received data access instruction does meet the specified criteria (affirmative outcome to decision 404), the instruction is marked (step 406). While the instruction may be marked by setting a single bit (DMRK) to indicate that it is an instruction of interest, it will be appreciated that additional information can be appended to the instruction to provide additional information, such as the specific type of instruction), though at the expense of additional bits. Thus marked, the instruction marking is carried with the instruction through the pipeline.

Once the instruction is marked, the data trace message for the received instruction may be generated at step 408 to include the instruction marking information, and in addition, the data trace information for the received instruction may be generated at step 410 to include location information for locating the corresponding data access instruction. As depicted, the data trace and PCM messages may be generated simultaneously or in an overlapping fashion. In selected embodiments, the data trace message includes the DMRK information, and is generated by the load store unit when the load store unit performs the data access specified by the received data access instruction (step 408). In addition, the PCM message includes at least enough information to locate the data access instruction in the program flow, and is generated by the completion unit when the completion unit retires the marked data access instruction (step 410). In this way, each data access instruction of interest is marked by the LSU by setting the DMRK bit, and it is then passed along the pipeline so that the PCM message is generated for each data trace message sent out with information that allows the PCM message to be correlated with the corresponding data trace message when both trace streams are post-processed after the run.

By now it should be appreciated that there has been provided a method and system for generating trace information for an instruction execution stream executed on an out-of-order pipelined processor. As disclosed, each branch instruction executed by the out-of-order pipelined processor is stored as part of an instruction trace message stream. In addition, one or more predetermined data access instructions (e.g., store instructions) that meet user-specified debug criteria (e.g., store instructions within a specified address range) are marked with at least a marked bit. For example, the marking may be implemented by setting a marked bit that is associated with a data access instruction to identify the data access instruction as an interesting data trace event within a specified address range. Once the predetermined data access instructions are marked, an in-order data trace message for each of the predetermined data access instructions is stored as part of a data trace message stream, where the data trace message for each predetermined data access instruction includes the marked bit. The data trace may be generated by the load store unit when it performs a data access operation specified by the predetermined data access instruction. In selected embodiments, the data trace message is stored in order by the load store unit which first waits for each predetermined store instruction to be retired by a completion unit, and then generates an in-order data trace message for each predetermined store instruction when a load store unit first attempts to perform the predetermined store instruction. Finally, an in-order program correlation message is stored for each of the marked predetermined data access instructions as part of the instruction trace message stream, where the program correlation message identifies where each predetermined data access instruction occurs in the instruction execution stream. The PCM may be generated by the completion unit when it retires a marked predetermined data access instruction, and may be stored using a Nexus Class 3 standard PCM message format. During post-processing, the instruction execution stream may be reconstructed by correlating the data trace message stream and instruction trace message stream. To this end, a debug logic circuit is provided for assembling the data trace message stream and instruction trace message stream and sending the assembled streams to an external terminal of the out-of-order pipelined processor through a trace port controller.

In another form, there is provided a data processing system and methodology which uses one or more out-of-order pipelined processor cores and a debug block unit to generate filtered and correlated trace information for an instruction execution stream. The out-of-order pipelined processor core may be implemented with a load store unit for marking predetermined store instructions meeting user-specified debug criteria with at least a marked bit, one or more pipelined stages coupled to receive instructions and data from the load store unit, and a completion unit coupled to receive instructions from the one or more pipelined stages for completing instructions in-order. In selected embodiments, the load store unit marks a store instruction falling within a user-specified data address range with a marked bit, and forwards the store instruction and marked bit to the completion unit. At the completion unit, each received store instruction is finished in order and program correlation messages are generated for only the store instructions which are marked with a marked bit. Each of the pipelined stages, load store unit, and/or completion unit may include a storage device for storing the marked bit with each predetermined store instruction as said predetermined store instruction is sent through the one or more pipelined stages. Once the completion unit finishes a store instruction, it instructs the load store unit to commit each completed store instruction. As for the debug block unit, it may be implemented with a data trace generator and a PCM generator. In operation, the data trace generator stores an in-order data trace message for each of the predetermined store instructions as part of a data trace message stream, where the data trace message for each predetermined store instruction comprises at least the marked bit. In a correlated fashion, the PCM generator stores an in-order program correlation message only for each of the predetermined store instructions that is marked with at least a marked bit as part of the instruction trace message stream, where the program correlation message identifies where each predetermined store instruction occurs in the instruction execution stream. With a trace port controller coupled to the debug block unit core, a stream of data trace messages and program correlation messages are received from the debug block unit for communication to an external test debug system.

In yet another form, there is provided a system and methodology for correlating data and instruction trace streams for an out-of-order processor system. As an initial step, a store instruction received at a first pipeline stage for storing data is assessed to determine if the store instruction meets a user-specified debug criteria. As will be appreciated, the reference to a first pipeline stage may refer to any stage in the pipeline (e.g., a load store unit), and need not necessarily refer to the first stage of the pipeline (e.g., a fetch unit). An example of such an assessment would be to calculate a first address for the store instruction and compare the first address to a user-selected address range of interest to see if the first address falls within the range. If the store instruction meets the user-specified debug criteria, the instruction is marked with a data mark bit, and the store instruction and data mark bit are sent through one or more one or more pipelined stages to a second pipeline stage (e.g., a completion unit). The store instruction is completed in order at the second pipeline stage which sends a store commit signal to the first pipeline stage upon completing the store instruction. In addition, the second pipeline stage generates a program correlation message only for store instructions having a data mark bit, where the program correlation message identifies where the store instruction occurs in the instruction execution stream and is provided as instruction trace information to a debug logic unit. And in response to the store commit signal, the first pipeline stage generates data trace information for the store instruction, where the data trace information for the store instruction comprises at least the data mark bit and where the data trace information is provided to the debug logic unit. A debug logic unit then assembles the data and instruction trace information into data and instruction trace streams for transmission to an external test debug system, and may do so by transferring the data and instruction trace streams through a common message queue to an auxiliary port in the debug logic unit.

The methods and systems for generating correlated data trace and instruction trace for out-of-order processors as shown and described herein may be implemented in hardware. For any hardware implementation, the elements used to perform various processor core operations may be implemented with electronic components and circuits known to those skilled in the art such that the circuit details need not be explained in any greater extent than that considered necessary as illustrated above for the understanding and appreciation of the underlying concepts of the present invention and in order not to obfuscate or distract from the teachings of the present invention. It will be appreciated that the separation of functionality into modules is for illustrative purposes, and alternative embodiments may merge the functionality of multiple modules into a single module or may impose an alternate decomposition of functionality of modules.

Although the described exemplary embodiments disclosed herein are directed to an exemplary information processing architecture and methods for using same, the present invention is not necessarily limited to the example embodiments illustrate herein. For example, the exemplary architecture shown in FIG. 2 is presented merely to provide a useful reference in discussing various aspects of the invention, has been simplified for discussion purposes, and is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for generating filtered and correlated trace information for an instruction execution stream executed on an out-of-order pipelined processor, comprising:
   storing each branch instruction executed by the out-of-order pipelined processor as part of an instruction trace message stream;
   marking one or more predetermined store instructions meeting user-specified criteria with at least a marked bit where marking one or more predetermined store instructions comprises setting a marked bit that is associated with a store instruction to identify the store instruction as an interesting data trace event within a specified address range or to identify the store instruction as an interesting data trace event according to a specified debug criteria;
   storing an in-order data trace message for each of the predetermined store instructions as part of a data trace message stream, where the data trace message for each predetermined store instruction comprises at least the marked bit;
   storing an in-order program correlation message (PCM) for each of the predetermined store instructions that is marked with at least a marked bit as part of the instruction trace message stream, where the program correlation message identifies where each predetermined store instruction occurs in the instruction execution stream, wherein each PCM is stored using a standard PCM message format; and
   buffering the data trace message stream and instruction trace message stream in a debug logic circuit.

2. The method of claim 1, where storing an in-order data trace message comprises generating a data trace message when a load store unit performs a store operation specified by the predetermined store instruction.

3. The method of claim 1, where storing an in-order program correlation message comprises generating a program correlation message when a completion unit retires a predetermined store instruction that is marked with at least the marked bit.

4. The method of claim 1, further comprising reconstructing the instruction execution stream based on the data trace message stream and instruction trace message stream.

5. The method of claim 1, further comprising:
sending the data trace message stream and instruction trace message stream from the debug logic circuit to an external terminal of the out-of-order pipelined processor.

6. The method of claim 1, further comprising sending the data trace message stream and instruction trace message stream to an external terminal of the out-of-order pipelined processor through a trace port controller.

7. The method of claim 1, further comprising correlating the data trace message stream and instruction trace message stream.

8. The method of claim 1, where storing an in-order program correlation message comprises storing a program correlation message using a Nexus Class 3 standard PCM message format.

9. The method of claim 1, where storing an in-order data trace message comprises:
waiting for each predetermined store instruction to be retired by a completion unit;
generating an in-order data trace message for each predetermined store instruction when a load store unit first attempts to perform the predetermined store instruction.

10. The method of claim 1, where marking one or more predetermined store instructions meeting user-specified criteria comprises marking one or more predetermined store instructions meeting user-specified debug criteria with at least a marked bit.

11. A data processing system, comprising:
an out-of-order pipelined processor core comprising:
a load store unit for marking predetermined store instructions meeting user-specified debug criteria with at least a marked bit, where marking one or more predetermined store instructions comprises setting a marked bit that is associated with a store instruction to identify the store instruction as an interesting data trace event within a specified address range or to identify the store instruction as an interesting data trace event according to a specified debug criteria,
one or more pipelined stages coupled to receive instructions and data from the load store unit, and a completion unit coupled to receive instructions from the one or more pipelined stages for completing instructions in-order; and
a debug block unit comprising:
a data trace generator for storing an in-order data trace message for each of the predetermined store instructions as part of a data trace message stream, where the data trace message for each predetermined store instruction comprises at least the marked bit, and
a program correlation message (PCM) generator for storing an in-order program correlation message only for each of the predetermined store instructions that is marked with at least a marked bit as part of the instruction trace message stream, where the program correlation message identifies where each predetermined store instruction occurs in the instruction execution stream, wherein each PCM is stored using a standard PCM message format, and
buffering logic operable to assemble the data trace message stream and instruction trace message stream for transmission to an external test debug system.

12. The data processing system of claim 11, further comprising a trace port controller coupled to the debug block unit core for receiving a stream of data trace messages and program correlation messages from the debug block unit for communication to an external test debug system.

13. The data processing system of claim 11, where the load store unit marks predetermined store instructions falling within a user-specified data address range with at least a marked bit.

14. The data processing system of claim 13, where the completion unit finishes each received predetermined store instruction in order and generates program correlation messages for only the predetermined store instructions which are marked with a marked bit.

15. The data processing system of claim 14, where the completion unit instructs the load store unit to commit each completed store instruction.

16. The data processing system of claim 11, where the one or more pipelined stages each comprise a storage device for storing the marked bit with each predetermined store instruction as each said predetermined store instruction is sent through the one or more pipelined stages.

17. A method of correlating data and instruction trace streams for an out-of-order processor system, comprising:
assessing a received store instruction at a first pipeline stage for storing data to determine if the store instruction meets a user-specified debug criteria;
marking the store instruction with a data mark bit if the store instruction meets the user-specified debug criteria;
sending the store instruction with a data mark bit through one or more pipelined stages to a second pipeline stage;
completing the store instruction in order at the second pipeline stage and sending a store commit signal to the first pipeline stage upon completing the store instruction;
generating a program correlation message (PCM) at the second pipeline stage only for store instructions having a data mark bit, where the program correlation message identifies where the store instruction occurs in the instruction execution stream and is provided as instruction trace information to a debug logic unit, wherein each PCM is stored using a standard PCM message format;
generating data trace information at the first pipeline stage for the store instruction in response to the store commit signal, where the data trace information for the store instruction comprises at least the data mark bit and where the data trace information is provided to the debug logic unit; and
assembling the data and instruction trace information into data and instruction trace streams at the debug logic unit for transmission to an external test debug system.

18. The method of claim 17 where assembling the data and instruction trace information comprises transferring the data and instruction trace streams through a common message queue to an auxiliary port in the debug logic unit.

19. The method of claim 17 where assessing a received store instruction at a first pipeline stage comprises calculating a first address for the store instruction and comparing the first address to a user-selected address range of interest.

* * * * *